(12) United States Patent
Derman et al.

(10) Patent No.: US 11,808,778 B2
(45) Date of Patent: Nov. 7, 2023

(54) INTELLIGENT PRESSURE CONTROL APPARATUS AND METHODS FOR MAINTAINING MANIFOLD PRESSURE IN A DIAGNOSTIC TESTING APPARATUS

(71) Applicant: Siemens Healthcare Diagnostics Inc., Tarrytown, NY (US)

(72) Inventors: Richard Derman, Wilmington, DE (US); David Haruch, Media, PA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 571 days.

(21) Appl. No.: 17/048,573

(22) PCT Filed: Mar. 28, 2019

(86) PCT No.: PCT/US2019/024501
§ 371 (c)(1),
(2) Date: Oct. 16, 2020

(87) PCT Pub. No.: WO2019/209454
PCT Pub. Date: Oct. 31, 2019

(65) Prior Publication Data
US 2021/0156878 A1 May 27, 2021

Related U.S. Application Data

(60) Provisional application No. 62/662,587, filed on Apr. 25, 2018.

(51) Int. Cl.
*G01N 35/10* (2006.01)

(52) U.S. Cl.
CPC ..... *G01N 35/1016* (2013.01); *G01N 35/1004* (2013.01); *G01N 2035/1034* (2013.01)

(58) Field of Classification Search
CPC .......... G01N 35/1004; G01N 35/1065; G01N 35/1009; G01N 35/1016
(Continued)

(56) References Cited

U.S. PATENT DOCUMENTS

| 5,503,036 A | 4/1996 | Nguyen et al. |
| 6,022,747 A | 2/2000 | Gherson et al. |

(Continued)

FOREIGN PATENT DOCUMENTS

| CN | 1704632 A | 12/2005 |
| CN | 102272609 A | 12/2011 |

(Continued)

OTHER PUBLICATIONS

PCT International Search Report and Written Opinion dated Jun. 10, 2019 (9 Pages).

(Continued)

*Primary Examiner* — Arlen Soderquist

(57) ABSTRACT

Apparatus configured to control chamber pressure during pipette rinsing having lower pressure recovery time. Pressure control apparatus includes pipettes to dispense liquid, a manifold chamber to supply liquid to the pipettes, a flow control valve in each flow path, a pump to supply the liquid, a pressure sensor to provide measured pressure, and a flow controller, which in a calibration mode, decreases a pump drive setting if measured pressure is high, increases the setting if measured pressure is low, and stores the pump drive setting for the individual combined operational state if the pressure is within predetermined pressure threshold limits, or in a testing mode, determines if the measured pressure is within the threshold limits for a previously-commanded state combination, and adjusts the pump drive setting if not within the threshold limits for a next time.

(Continued)

Methods for operating pressure control apparatus are described, as are other aspects.

21 Claims, 6 Drawing Sheets

(58) Field of Classification Search
USPC .......................................................... 436/180
See application file for complete search history.

(56) References Cited

U.S. PATENT DOCUMENTS

| | | | |
|---|---|---|---|
| 6,119,533 | A | 9/2000 | Gherson et al. |
| 6,158,269 | A | 12/2000 | Dorenkott et al. |
| 6,213,354 | B1 | 4/2001 | Kay |
| 6,370,942 | B1 | 4/2002 | Dunfee et al. |
| 6,456,944 | B1 | 9/2002 | Burkhardt et al. |
| 7,160,511 | B2 | 1/2007 | Takahashi et al. |
| 7,477,997 | B2 | 1/2009 | Kaplit |
| 7,634,378 | B2 | 12/2009 | Kaplit |
| 7,867,769 | B2 | 1/2011 | Dunfee et al. |
| 7,926,325 | B2 | 4/2011 | Kaplit |
| 8,287,820 | B2 | 10/2012 | Williams et al. |
| 8,666,556 | B2 | 3/2014 | Agahi |
| 8,809,069 | B2 | 8/2014 | Brady et al. |
| 9,052,300 | B2 | 6/2015 | Evers et al. |
| 2003/0215957 | A1 | 11/2003 | Lemmo et al. |
| 2004/0014238 | A1 | 1/2004 | Krug et al. |
| 2004/0217191 | A1 | 11/2004 | Muratsubaki et al. |
| 2006/0133965 | A1* | 6/2006 | Tajima ............... G01N 35/1009 422/63 |
| 2009/0144016 | A1 | 6/2009 | Kaplit |
| 2011/0259187 | A1 | 10/2011 | Sipola et al. |
| 2015/0192601 | A1 | 7/2015 | Cohen |
| 2015/0276534 | A1 | 10/2015 | Dunfee |
| 2016/0003860 | A1* | 1/2016 | Wang ....................... G01L 9/00 73/714 |
| 2016/0010632 | A1 | 1/2016 | Knowles, Jr. et al. |
| 2016/0258972 | A1 | 9/2016 | Zordan |
| 2018/0246134 | A1* | 8/2018 | LaChance ............... B01L 3/021 |

FOREIGN PATENT DOCUMENTS

| | | | | |
|---|---|---|---|---|
| CN | 102449569 A | | 5/2012 | |
| JP | S59-040139 A | | 3/1984 | |
| JP | H01-169363 A | | 7/1989 | |
| JP | H06-130072 A | | 5/1994 | |
| JP | H08-338801 A | | 12/1996 | |
| JP | H11-69363 A | | 3/1999 | |
| JP | 2000-213466 A | | 8/2000 | |
| JP | 2006-343243 A | | 12/2006 | |
| JP | 3128793 U | | 1/2007 | |
| JP | 2017109445 A | | 6/2017 | |
| WO | WO-2007022667 A1 * | | 3/2007 | ............. B01L 3/021 |
| WO | 2009070577 A1 | | 6/2009 | |
| WO | 2015066342 A1 | | 5/2015 | |
| WO | 2018/055931 A1 | | 3/2018 | |

OTHER PUBLICATIONS

Extended EP Search Report dated May 21, 2021 of corresponding European Application No. 19793481.3, 4 Pages.

* cited by examiner

INTELLIGENT PRESSURE CONTROL APPARATUS AND METHODS FOR MAINTAINING MANIFOLD PRESSURE IN A DIAGNOSTIC TESTING APPARATUS

CROSS-REFERENCE TO RELATED APPLICATIONS

This application claims priority to U.S. Provisional Application Ser. No. 62/662,587 filed on Apr. 25, 2018, the contents of which is incorporated herein by reference in its entirety.

FIELD

The present disclosure relates to methods and apparatus for controlling pressure in a manifold chamber of a bio-liquid diagnostic testing apparatus.

BACKGROUND

In testing within clinical laboratories to measure various chemical constituents of bio-liquids obtained from patients, such as blood serum, blood plasma, and the like, fully-automated diagnostic testing apparatus, such as clinical analyzers or immunoassay analyzers, may reduce the number of trained technicians required to perform such bio-liquid analyses, improve accuracy of the bio-liquid diagnostic testing, and reduce the overall cost per test.

Such fully-automated diagnostic testing apparatus can include an automated aspirating and dispensing apparatus, which is configured to aspirate a liquid(s) (e.g., a sample of the bio-liquid and/or a liquid reagent) from a first container and dispense that liquid into another container, such as a reaction vessel (e.g., a cuvette). The aspirating and dispensing apparatus includes a plurality of moveable pipettes (sometimes referred to as "probes") each mounted on a moveable component of a robot. The moveable pipettes are configured to perform the liquid aspiration and dispensing functions and transfer the liquid(s) from one location to the reaction vessel.

After the aspiration and dispense operation, the moveable components and each pipette may be positioned at a waste receptacle and rinse liquid can be dispensed through an internal passageway of the pipette to facilitate cleaning thereof. In some instances, the pipette may be immersed in a wash station bath to facilitate cleaning of an outside of the pipette. This pipette internal rinsing process may be accomplished via a pump including a proportional Integral (PI) feedback control method. Such pipette cleaning process prevents cross contamination of one bio-liquid from one test to another, such as from one patient specimen to another patient specimen.

Conventional aspirating and dispensing apparatus of such diagnostic testing apparatus are able to perform this aspiration and dispense acceptably. However, systems that perform faster, more reliably, and/or less expensively are sought after.

SUMMARY

In a first aspect, a pressure control apparatus is provided. The pressure control apparatus includes a plurality of pipettes configured to dispense a liquid from an outlet of each of the plurality of pipettes; a manifold including a manifold chamber configured to supply the liquid to the outlets of the plurality of pipettes through flow paths passing between the manifold chamber and the outlets; a flow control valve in each of the flow paths and configured to modulate a flow of the liquid in each of the flow paths; a pump interconnected to a liquid source and configured to supply the liquid to the manifold chamber and maintain a target pressure in the manifold chamber; a pressure sensor coupled to the manifold chamber and configured to provide a measured pressure correlated to a pressure within the manifold chamber; and a flow controller configured to command an individual operational state combination from a plurality of operational state combinations, the flow controller further configured to: in a calibration mode, decrease the pump drive setting if the measured pressure is too high, increase the pump drive setting if the measured pressure is too low, and store a pump drive setting for the individual combined operational state if the pressure measurement is within predetermined threshold limits of the target pressure, or in a testing mode, determine if the measured pressure in the manifold chamber is within the predetermined threshold limits of the target pressure for a previously-commanded state combination commanded prior to the individual state combination, and adjust the pump drive setting if not within the predetermined threshold limits for a next time the previously-commanded state combination is commanded.

According to another aspect, a pressure control method for maintaining manifold pressure in a manifold chamber of a flow control apparatus in a diagnostic testing apparatus is provided. The pressure control method includes characterizing an operational state combination of a plurality of flow control valves in flow paths connected to the manifold chamber; providing a drive setting to a pump supplying liquid to the manifold chamber; measuring a pressure in the manifold chamber to provide a measure pressure; determining if the measured pressure in the manifold chamber is within predetermined pressure threshold limits of a target pressure; and either: increasing or decreasing the drive setting if not within the predetermined pressure threshold limits, or storing an optimal drive setting for the operational state combination of the plurality of flow control valves if within the predetermined pressure threshold limits.

In another aspect, a pressure control method for maintaining pressure in a manifold chamber of a flow control apparatus in a diagnostic testing apparatus is provided. The pressure control method includes selecting a new operational state combination of a plurality of flow control valves in flow paths connected to the manifold chamber; measuring the manifold pressure in the manifold chamber of an existing operational state combination before making a change to the new operational state combination; outputting a pump drive setting to a pump supplying liquid to the manifold chamber; changing from the existing operational state combination to the new operational state combination; determining if the measured pressure in the manifold chamber is within predetermined pressure threshold limits of a target pressure; and either: selecting another new operational state combination, or adjusting the pump drive setting for the existing operational state combination if not within the predetermined pressure threshold limits.

Still other aspects, features, and advantages of the present disclosure may be readily apparent from the following detailed description by illustrating a number of example embodiments, including the best mode contemplated for carrying out the present invention. The present disclosure may also be capable of other and different embodiments, and its details may be modified in various respects, all without departing from the scope of the present disclosure. Accordingly, the drawings and descriptions are to be regarded as illustrative in nature, and not as restrictive. The disclosure is to cover all modifications, equivalents, and alternatives falling within the scope of the claims.

BRIEF DESCRIPTION OF THE DRAWINGS

The disclosure will be better understood by referring to the detailed description taken in conjunction with the following drawings. The drawings are not necessarily drawn to scale. Like numerals are used throughout the specification to denote like elements.

DETAILED DESCRIPTION

Figure 1:
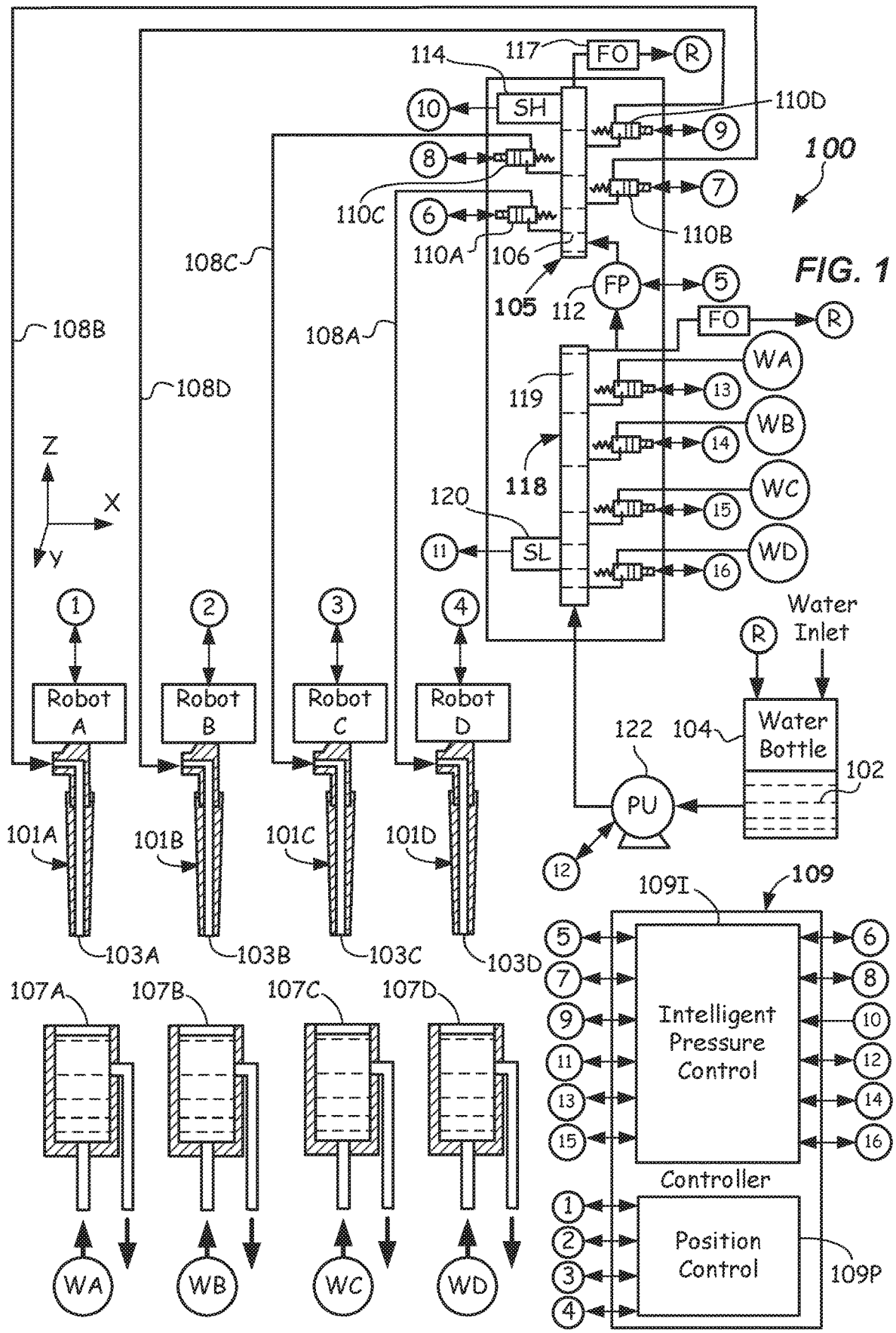
FIG. 1 illustrates a schematic diagram of a pressure control apparatus configured to control pressure in a manifold chamber of diagnostic testing apparatus according to embodiments.

In view of the foregoing difficulties, there is an unmet need to more accurately control pressure within a pressure control apparatus of a diagnostic testing apparatus when dispensing liquid (e.g., rinse liquid) from multiple pipettes coupled to a common manifold chamber. The pressure control apparatus and method described herein have utility for use in analyzers for carrying out measurements on a bio-liquid specimen, such as analyte measurements, assays, immunoassays, or other clinical tests on bio-liquid specimens. In particular, the pressure control apparatus and methods described herein have applicability to the process of pipette washing, wherein the analyzers each include multiple pipettes configured to aspirate and dispense bio-liquid specimen, and/or reagent, and/or other liquids at different times. The pipettes are cleaned by dispensing a rinsing liquid (e.g., water) via the operation of the pressure control apparatus. Embodiments described herein improve dramatically of the ability to control pressure within the manifold chamber coupled to the pipettes regardless of the number of wash operations that are taking place, such as when two or more pipettes are undergoing a wash operation at once.

In one aspect, embodiments of the disclosure provide pressure control apparatus and methods that substantially reduce variations in pressure within the manifold chamber that is configured to supply the rinsing liquid to the multiple pipettes. For example, only one of the multiple pipettes or more than one of the multiple pipettes, such as 2, 3, 4 or more, may be dispensing rinse liquid at a time. Thus, depending on the number of pipettes commanded to dispense the rinse liquid, the load on a pump provided to supply rinsing liquid to the manifold chamber can vary greatly. The present pressure control apparatus and method ensures that a constant pressure head is available regardless of the number of pipettes that are being commended to dispense rinse liquid. Thus, the pressure control apparatus and methods provide rapid rinse capability by ensuring a substantially constant source of pressurized rinse liquid is available.

Accordingly, using embodiments of the present disclosure may allow rinse operations of each pipette to be carried out more rapidly than in the prior art, in that wait time is minimized before a threshold pressure for dispensing the rinsing liquid is again reached.

In particular, the inventors herein have discovered that using the PI control of a pump and a variable orifice pressure relief valve in accordance with the prior art in an attempt to control the manifold chamber pressure at a relatively stable (relatively constant) value was a challenge. In particular, that using PI control, relatively large variations in pressure actually occur during operation. In short, PI control is relatively ineffective at maintaining the manifold pressure at a constant value and large transient periods can occur before pressure is again sufficient after a rinse liquid dispense. As a result, wait times between rinse liquid dispenses to rinse various pipettes in use can be excessive, being as much as 50 ms in some cases. Therefore, throughput of the analyzer can be affected. Embodiments of the disclosure rectify this wait0time situation.

These and other aspects and features of embodiments of the disclosure will be described with reference to FIGS. 1-4 herein.

Referring now to FIG. 1, a first embodiment of a pressure control apparatus 100 is illustrated and described. The pressure control apparatus 100 includes a plurality of pipettes 101A-101D that are configured to dispense a liquid 102 (e.g., water) from an outlet 103A-103D of each of the plurality of pipettes 101A-101D. The dispensing of the liquid 102 (e.g., water) from the outlet 103A-103D can be commanded, for example, after a previous dispense operation wherein dispense of a bio-liquid and/or a reagent is accomplished by the one or more of the pipettes 101A-101D. The rinse operation is intended to rinse away any remaining residual portion of the bio-liquid and/or a reagent clinging to the passages within the respective pipette(s) 101A-101D. During the rinse operation, a robot, such as Robot A-Robot D, can be commanded by position control 109P of a controller 109. The command can be to move to a wash station 107A to 107D and insert the pipette 101A-101D into a wash station 107A-107D to a desired depth and then dispense a rinse liquid 102 from the passage of the pipettes 101A-101D.

Robots A-D can be any suitable robot configured to carry out motion of the pipettes 101A-101D in one or more coordinate directions, such as X, Y, and/or Z. Robots A-D may include a robot component (e.g., robot arm, boom, frame, or the like) to which the pipettes 101A-101D may be mounted to accomplish motion thereof. The robot component may swing about a fixed axis by the operation of a rotational actuator to provide motion capability in the X-Y plane, for example. In some embodiments, a gantry robot may be used to carry out motion. Optionally or additionally, vertical motion of the pipettes 101A-101D along a vertical Z axis may be imparted by operation of a suitable actuator of the moveable component coupled to the pipettes 101A-101D. The actuator may be operable to descend and ascend the pipettes 101A-101D into and out of a reagent container (not shown) containing a volume of a reagent liquid and/or into and out of a sample container (not shown) containing bio-liquid, so that at least some liquid may be aspirated and then dispensed into a reaction vessel (e.g., a cuvette) for testing. The biological liquid may be blood, blood serum, plasma, cerebral liquid, spinal liquid, interstitial liquid, urine, or the like. Other suitable liquids may be aspirated and tested. Additionally or optionally, one or more actuators may be provided to impart motion along the X axis and/or Y axis.

Each of the actuators may be suitably actuated under the control of a position control 109P of controller 109 to impart the desired motions to the pipettes 101A-101D in one dimensional, two dimensional, or three dimensional space.

The respective actuators may be operated to move the pipettes 101A-101D from the reagent container to a reaction vessel (e.g., a cuvette—not shown), and/or from the sample container (not shown) to the reaction vessel, and from the reaction vessel to a respective wash station 107A-107D, for example. Four pipettes 101A-101D and wash stations 107A-107D are shown, but there may be more or less of each and the numbers of pipettes may be different that the numbers of wash stations.

Thus, any residual material (specimen and/or reagent) can be removed from the passages of the pipettes 101A-101D by undergoing the wash operation. Furthermore, wash liquid may be supplied to each of the respective wash stations 107A-107D from a low pressure manifold 118, wherein each wash station 107A-107D can include a reservoir of wash liquid contained therein. Wash liquid can be water or a water-based soapy liquid, for example. Other suitable wash liquids may be used. There may be wash liquid circulation through the respective reservoirs via inlet and outlet conduits fluidly coupled to the respective reservoirs in some embodiments (arrows indicating one example flow direction).

Again referring to FIG. 1, the pressure control apparatus 100 further includes a manifold 105 (e.g., a high pressure manifold, including a manifold chamber 106 therein. The manifold chamber 106 is a chamber configured to supply the liquid 102 to the outlets 103A-103D of the plurality of pipettes 101A-101D. The liquid 102 can be supplied through flow paths 108A-108D passing between the manifold chamber 106 and the outlets 103A-103D. The flow paths 108A-108D can include flexible, small-diameter tubes, or the like.

A flow control valve 110A-110D is provided in each of the flow paths 108A-108D and is configured to modulate a flow of the liquid 102 in each of the flow paths 108A-108D, such as between being ON or OFF. Any suitable two-way valve may be used, such as a solenoid-actuated flow control valve having an ON state and an OFF state. Other types of valves can be used. In the depicted embodiment, ON provides a valve configuration where flow of liquid 102 is enabled, whereas OFF provides a valve configuration that is closed such that no flow of liquid 102 is provided. Thus, an ON configuration for one or more of the flow control valve(s) 110A-110D causes liquid 102 to flow through the respective flow path 108A-108D thus rinsing of the pipette(s) 101A-101D that are associated with a flow control valve 110A-110D that is configured to ON. The valve configuration of the flow control valves 110A-110D is based upon suitable commands from the intelligent flow control 109I. It should be recognized that a number of different flow demands may be present depending on the number and combination of the flow control valves 110A-110D that are commanded to ON by the intelligent flow control 109I of controller 109.

Figure 3A:
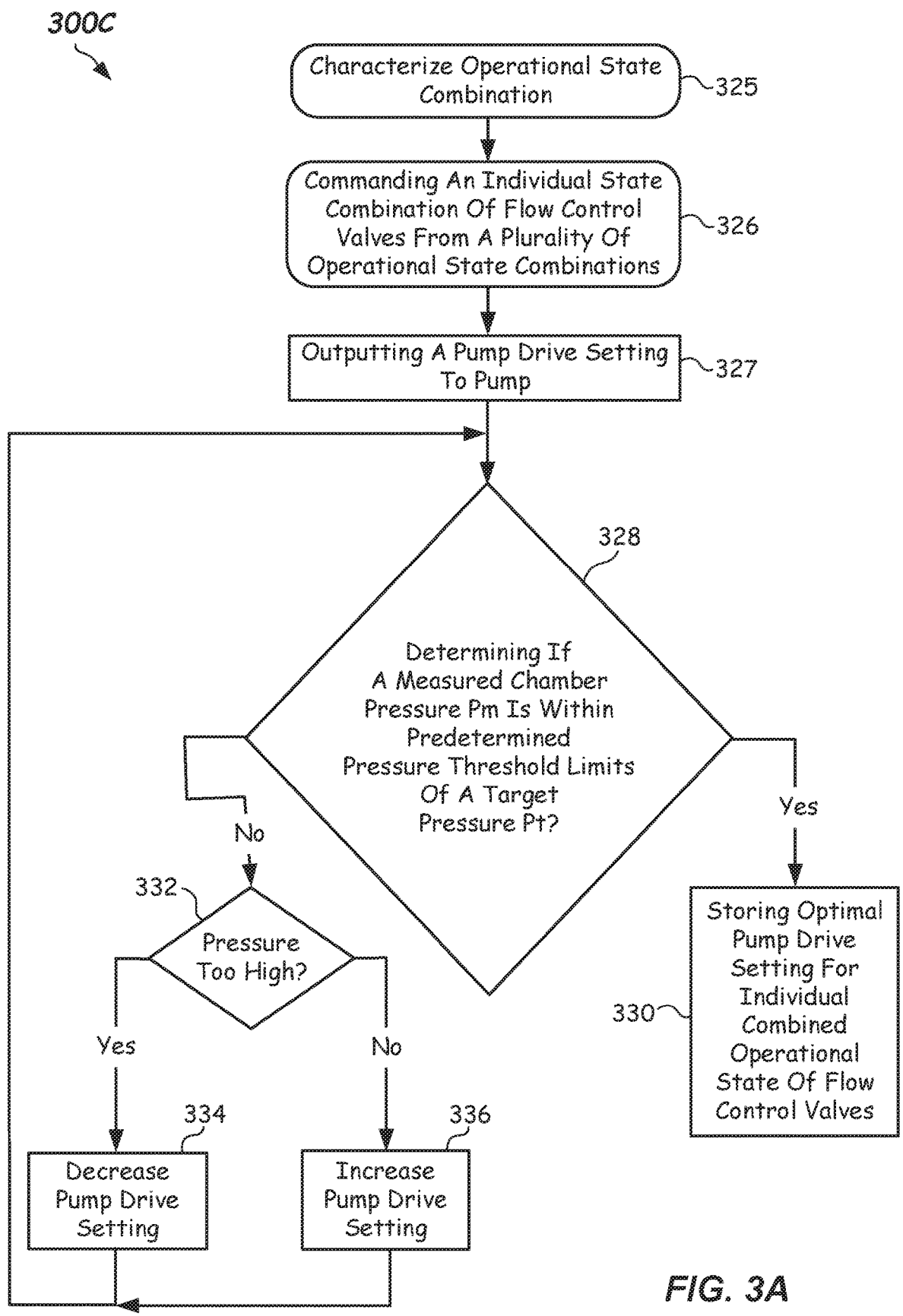
FIG. 3A illustrates a flowchart of a calibration operation of a pressure control apparatus according to embodiments.
Figure 3B:
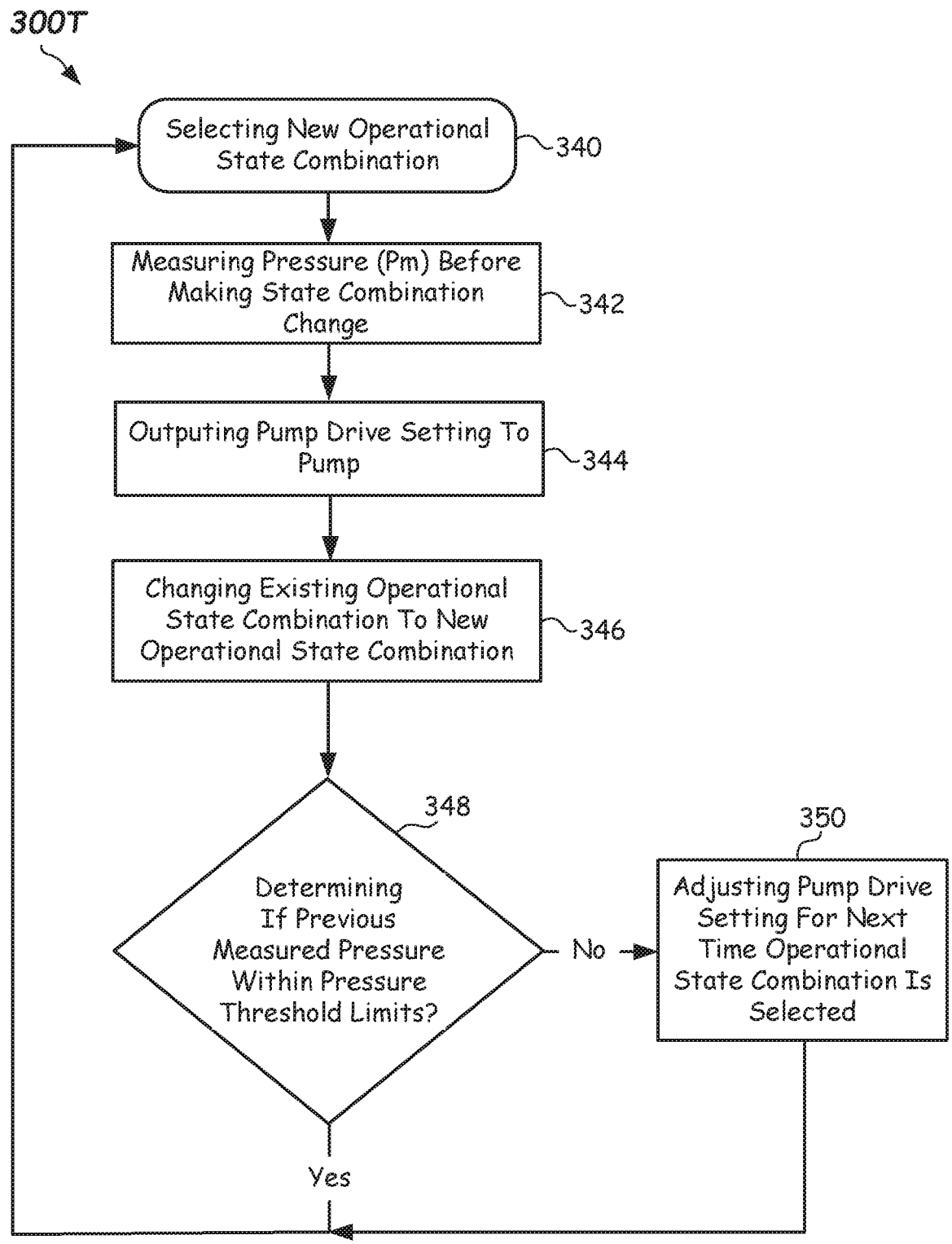
FIG. 3B illustrates a flowchart of a testing operation of a pressure control apparatus according to embodiments.
Figure 3C:
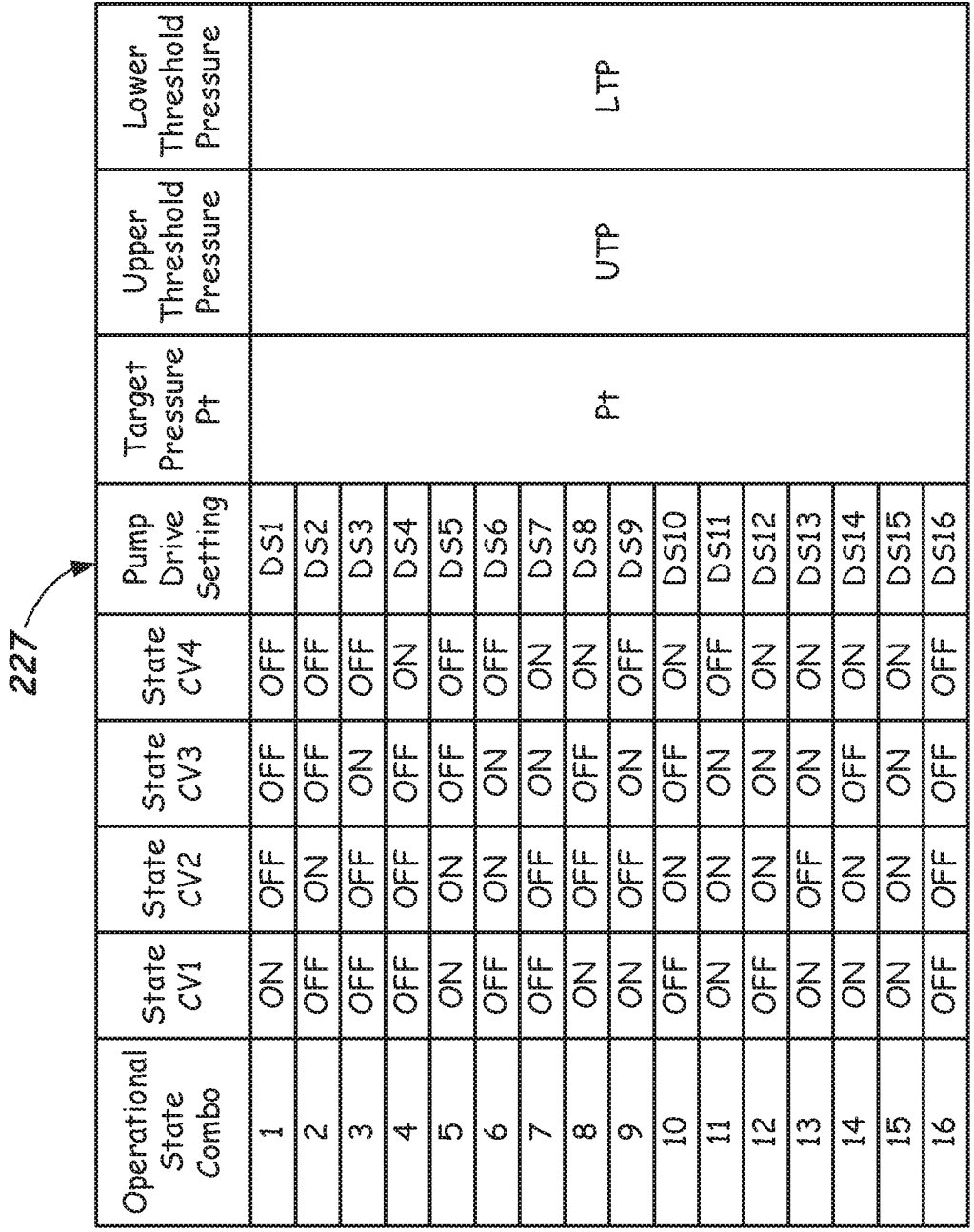
FIG. 3C illustrates an embodiment of a look-up table showing pump drive settings for a number of operational state combinations of a pressure control apparatus and method according to embodiments.

For example, as shown, with four pipettes, 16 different flow demands are possible depending upon the respective operational state combinations of each of the flow control valves 110A-110D (see FIG. 3C for the various ON and OFF configurations for the plurality of operational state combinations). For example, there could be all OFF (operational state 16), all ON (operational state 15), and any number of combinations of ON and OFF (see operational states 1-14). Four pipettes 101A-101D are shown in the depicted embodiment, but the pressure control apparatus and methods herein are equally applicable to apparatus with less or more pipettes and corresponding flow paths receiving rinse liquid from a common manifold chamber (e.g., such as 3, 5, 6, 7, 8, 9, 10 or more pipettes). In some embodiments, the number of flow control valves in the pressure control apparatus 100 can number between about 2 and 22, for example. However, other numbers are possible.

The pressure control apparatus 100 further includes a pump 112 (e.g., a high pressure pump) interconnected to a liquid source 104 and configured to supply the liquid 102 to the manifold chamber 106 via its operation. The pump 112 may be a fast pump, such as a Denier Silencer type pump having the ability to operate at a designed pressure of between about 50 psi and about 70 psi, for example. Other suitable operational pressures may be used. The liquid source 104 may be a water bottle or other suitable reservoir or liquid source. The operation of the pump 112 is commanded by the intelligent flow control 109I of controller 109 to maintain a target pressure Pt in the manifold chamber 106 of the high pressure system regardless of the operational state combination. Maintenance of the target pressure Pt is provided in the present flow control apparatus 100 so that sequential rinse operations can take place very rapidly with minimized transient wait times. The target pressure Pt is maintained first by a suitable calibration method, as described with reference to FIG. 3A, and later, in testing, by measured chamber pressure Pm before a new state combination is commended, to determine if the measured chamber pressure Pm is within a predetermined threshold of the target pressure Pt. If the measured chamber pressure Pm is not within the predetermined threshold of the target pressure Pt, then the pump drive setting for the individual state combination that had been commanded is adjusted for the next time that operational state is commanded.

The pressure control apparatus 100 further includes a pressure sensor 114 coupled to the manifold chamber 106 of the high pressure system that is configured to determine and provide the measured chamber pressure Pm that is correlated to the pressure in the manifold chamber 106 to the intelligent control 109I of the controller 109. The measured chamber pressure Pm may be in the form of a digital or analog signal provided to the controller 109. Suitable conditioning electronics (conditioning 217 in FIG. 2) may be used to condition the signal for use by the controller 109. The pressure sensor 114 can be a high pressure sensor (SH) that is configured to measure pressures in the range of between about 15 psi and 150 psi within the manifold chamber 106. The pressure sensor 114 can be a piezoresisitive silicon pressure sensor, such as the TRUESTABILITY™ RSC series pressure sensors available from Honeywell, East Syracuse, N.Y., for example. Other suitable pressure sensors may be used. Sensor conditioning 217 may be provided to condition the raw pressure signal provided by pressure sensor 114. This sensor conditioning 217 may include a suitable ND converter, amplifier, and possibly a suitable anti-aliasing filter. The anti-aliasing filter may have a cutoff frequency of about 160 Hz or more. Sampling rates of the measured chamber pressure Pm may be at 2,000 samples/sec or higher, for example. Other sampling rates can be used.

The pressure control apparatus 100 further includes a return flow channel R coupled between the manifold chamber 106 and the liquid source 104. In the depicted embodiment, the return flow channel R comprises a conduit including a fixed flow restriction 117, such as a fixed orifice (FO) therein. The return flow channel R returns flow to the liquid source 104, for example. Return flow channel R may include filtering of the liquid 102 in the return flow channel R, such as with any suitable particulate filter. The fixed flow restriction 117 (e.g., fixed orifice—FO) can comprise a circular orifice having dimensions such as diameter of between 0.25 mm and 6.35 mm and length of between 2 mm and 8 mm, for example. Other fixed orifice dimensions can be used. The fixed flow restriction 117 provides a flow restriction that is substantially unchangeable thereby providing a return flow channel R to the liquid source 104 that provides a constant flow and a constant pressure restriction. The fixed flow restriction 117 advantageously allows the flow through the manifold chamber 106 to not go to zero when all of the flow control valves 110A-110D are in their OFF state. This allows pressure control to be maintained, even under this all-OFF condition. This can greatly reduce the need for high dynamic range capability of the pump and fast response time, thus lowering cost thereof. A similar fixed flow restriction, such as a fixed orifice (FO) and a return channel R returning liquid 102 to the liquid source 104 can be provided.

Figure 2:
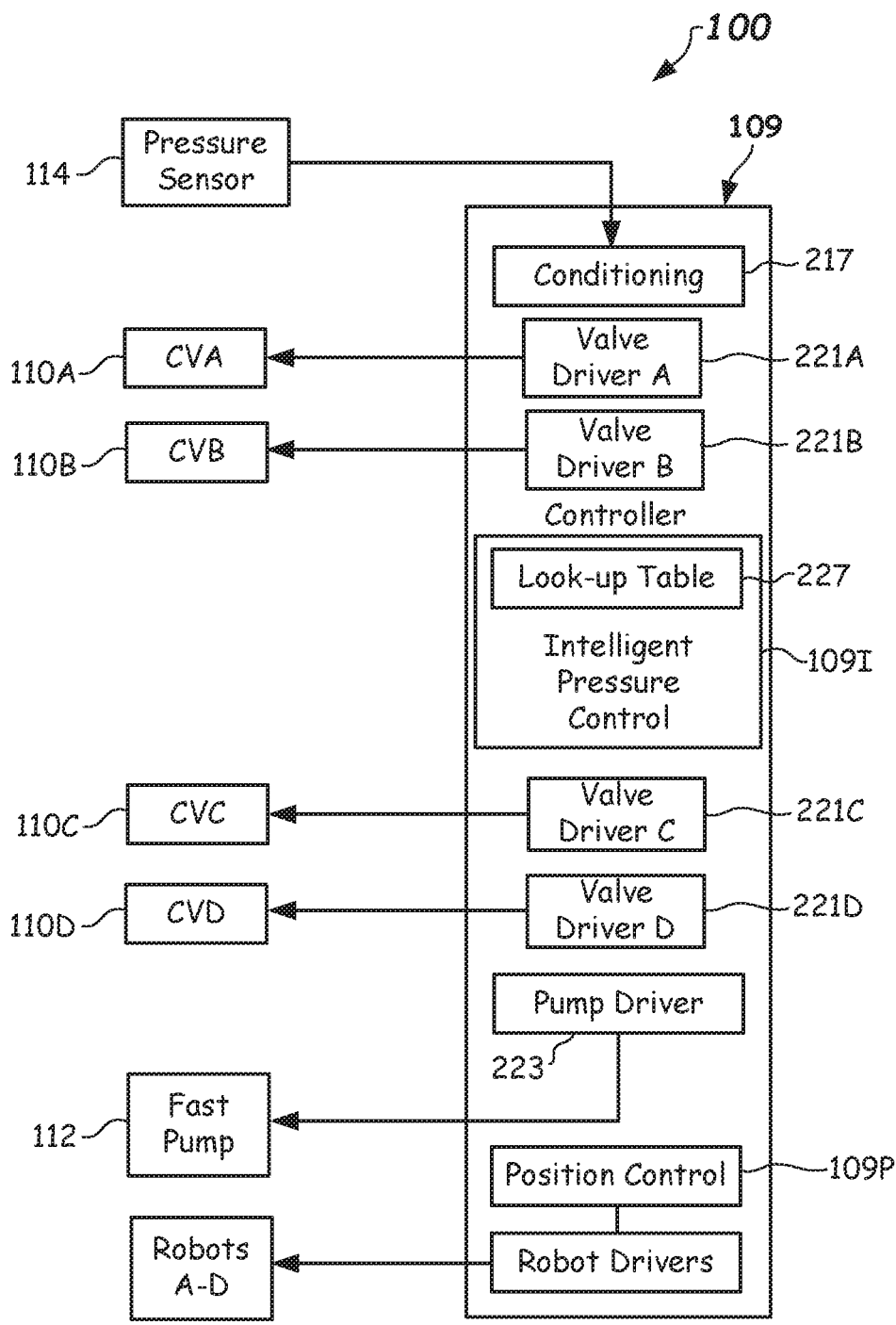
FIG. 2 illustrates a schematic diagram of components of a pressure control apparatus according to embodiments.

In more detail, the intelligent flow control 109I of the controller 109 is configured to carry out a calibration mode and/or a testing mode. In the calibration mode (FIG. 3A), the intelligent flow control 109I determines if the measured pressure Pm in the manifold chamber 106 is within predetermined threshold limits of the target chamber pressure Pt. The intelligent flow control 109I then can either adjust a pump drive setting DS (up or down) if not within the predetermined threshold limits, or if the measured chamber pressure Pm is within the predetermined threshold limits, store an optimal drive setting DS (e.g., Ds1-Ds16) for the operational state combination of the plurality of flow control valves 110A-110D. The storage can be in memory as a look-up table 227 in a database as shown in FIGS. 2 and 3C. Any suitable predetermined pressure threshold limits may be used, such as +/−5%, +/−4%, +/−3%, +/−2%, +/−1%, or even +/−0.5% of the target pressure Pt.

The controller 109 may be any suitable computing device, such as a digital computer including a suitable microprocessor configured to carry out executable instructions and comparisons, a suitable memory such a fixed memory article (e.g., hard drive, or the like) configured to store the information in a database (look-up table 227), and conditioning electronics 227 and electronic peripherals (e.g., drivers 221A-221D) enabling sending and receiving of signals to and from the sensors 114, 120 and pumps 112, 122.

In the embodiment shown, pump 112 can receive a flow of liquid 102 through the low pressure manifold 118, which in the depicted embodiment can be configured as part of a low pressure liquid supply system configured to provide a flow of liquid 102 comprising the wash liquid to the wash stations 107A-107D. It should be apparent that the high pressure system including manifold 105 could optionally receive flow of the liquid 102 directly from the liquid source 104, but that receiving the flow through the low pressure systems reduces the demand on the pump 112, and is thus desirable.

The pressure control apparatus 100 including the low pressure liquid supply system can include a low pressure sensor 120 coupled to the low pressure manifold 118 that is configured to supply pressure measurements concerning pressure in a low pressure manifold chamber 119 to the intelligent flow control 109l of the flow controller 109. A low pressure pump 122 can be driven in a similar manner as pump 112 to provide a substantially constant pressure in low pressure manifold chamber 119.

The flow control apparatus 100 may be used in conjunction with an aspirator/dispense apparatus that is provided to facilitate exacting and precision aspiration of the desired liquid (e.g., reagent liquid or specimen) into the interior of the pipettes 101A-101D. The aspirated volume may be quite small, i.e., less than about 25 µL in some embodiments. Aspiration/dispensing apparatus may include a high-precision pump (not shown) configured to draw in (e.g., aspirate) a desired amount of the liquid (e.g., liquid specimen) into the interior of the pipette 101A-101D and control the dispensing operations. The aspiration/dispensing apparatus may include other conventional components, such as a high precision displacement type pump, one or more valve(s), accumulator (s), distributors, or other hydraulic components (not shown) to effectuate the liquid aspiration and dispense. Any suitable apparatus for precision aspiration and dispense of the liquid specimen into the pipette 101A-101D may be used. The supply of backing liquid to accomplish the aspiration and dispense may be the liquid 102 and the high-precision pump may obtain the liquid 102 from either of the high pressure manifold 112 or the low pressure manifold 118.

Referring now to FIGS. 2, and 3A through 3C, broad methods of the disclosure are illustrated and the controlled components are described. As discussed above, the pressure control apparatus 100 is capable of being operating in a first mode or a second mode. In the first mode, a calibration mode, as shown in FIG. 3A, calibration of the pressure control apparatus 100 is carried out. In the testing mode, the pressure control apparatus 100 is operated in a manner where calibration is verified, or where previously-stored pump drive settings are possibly updated.

The calibration method 300C as shown in FIG. 3A includes, in 325, characterizing an operation state combination. Characterizing is simply determining the operational state combination that is desired to be first calibrated for the flow control valves 110A-110D. For example, calibration may start with operational state combo 1 (CV1-ON, CV2-OFF, CV3-OFF, CV4-OFF) and one-by-one the method 300C can perform the calibration for the other states 2-16. In some embodiments, the operational state for each of the flow control valves 110A-110D is either an ON state or an OFF state. The operational state combination of each of the flow control valves 110A-110D can be characterized by any suitable means. For example, the operational state combination of the flow control valves 110A-110D can be characterized by parsing commands issued by the controller 109 calling for a new operational state combination (i.e., flow control valve settings). The method 300C can then, in 326, command an individual state combination of flow control valves 110A-110D from a plurality of operational state combinations. In 327, the method 300C can output a pump drive setting DS (i.e., a pump drive voltage) to the pump 112. The command in 326 and 327 can be made simultaneously, for example. In some embodiments, the lag or delay for each of the flow control vales 110A-110D and of the pump 112 can be taken into account so that they each are actuated substantially at the same time.

For the configuration of FIG. 1, there are 16 operational state combinations as shown in the look-up table 227 shown in FIG. 3C. For each operational state combination, there is a pre-established pump drive setting DS1-DS16 that has been established by the calibration method 300C. For example, for an operational state combination of CVA-ON, CVB-OFF, CVC-ON, CVD-OFF, the pump drive setting (DS) is set to DS9, which is a pre-established pump drive setting value (such as a drive voltage output by pump driver 223). These pump drive settings D1-D16 can be provided by implementing the calibration method 300C for the particular pressure control apparatus 100.

In more detail, once the individual operational state combination has been commanded to the flow control valves 110A-110D in 326 and the pump drive setting has been outputted to the pump 112 in 327, the method 300C determines if the measured chamber pressure Pm in the manifold chamber 106 is within predetermined threshold limits of the target pressure Pt in 328. In particular, the intelligent flow control 109I, which is a suitable software routine stored in memory of the controller 109, executes a comparison operation to determine if a measured chamber pressure Pm in the manifold chamber 106 is within the predetermined pressure threshold limits of the target pressure Pt. In some embodiments, the predetermined threshold limits of the target pressure Pt may be based upon a percentage of target pressure Pt, such as within +/−5%, +/−4%, +/−3%, +/−2%, +/−1%, or even +/−0.5% of Pt, for example. Other suitable pressure threshold limits may be used. The target pressure Pt and the upper and lower threshold pressures (UTP, LTP) can be stored in the look-up table 227 as part of the stored database in memory. If the measured chamber pressure Pm, as measured by pressure sensor 114, is within the predetermined threshold limits of the target pressure Pt (YES—between the upper (UTP) and lower (LTP) threshold pressures), then in 330, a refined drive setting (optimal drive setting) for that operational state combination of the flow control valves 110A-110D can be stored. This may be a first population of the look-up table, or as a replacement of the then-existing or pre-populated pump drive setting. This stored pump drive setting can then be used in the testing mode when that operational state combination of the flow control valves 110A-110D is commanded. Thus, the method 300C stores an optimal pump drive setting in the look-up table 227 that can be used when testing commences.

If the method 300C determines that the measured pressure Pm is not within the predetermined threshold thresholds of the target pressure Pt (NO), then in 332, an additional comparison operation is undertaken to determine if the pressure is too high, i.e., above the upper threshold pressure (UTP). Upper threshold pressure (UTP) may be stored in the look-up table 227 as shown in FIG. 3B. If the measured pressure Pm is too high (YES), then the pump drive setting for the individual operational state combination of flow control valves 110A-110D is decreased in 334. The amount of the decrease in the pump drive setting can be a fixed amount, an amount based on a proportion or difference between the measured pressure Pm and the target pressure Pt, or some other suitable setting adjustment. For example, the Optimal drive setting (ODS) can be adjusted based on some factor multiplied by the drive setting (DS) that is currently stored, per equation 1 below:

$$ODS = DS \times Pt/Pm \quad \text{Eqn. 1}$$

Once the new optimal drive setting (ODS) is found, the optimal drive setting (ODS) can be stored in the look-up table 227 replacing any existing pump drive setting (DS) for use during testing.

If the method 300C determines that the measured pressure Pm is not too high in 332 (NO), then the measured pressure Pm is below the lower threshold pressure (LTP). Lower threshold pressure (LTP) may also be stored in a look-up table 227 as shown in FIG. 3B. If the measured pressure Pm is not too high (NO), i.e., it is too low or outside of the lower threshold pressure (LTP), then the pump drive setting (DS) for the individual state combination of flow control valves 110A-110D is increased in 336. The amount of the increase in the pump drive setting can be a fixed amount, an amount based on a proportion or difference between the measured pressure Pm and the target pressure Pt, or some other suitable drive setting adjustment. For example, the optimal drive setting (ODS) can be increased per equation 1 above. The new optimal drive setting (ODS) can be stored in the look-up table 227 replacing any existing pump drive setting (DS) for use in testing.

Thus, the pump drive settings D1-D16 can be provided (e.g., pre-populated in the look-up table 227) based on calibration operations carried out in method 300C. In some embodiments, the pump drive settings D1-D16 can be provided (e.g., pre-populated in the look-up table 227) based on calibration operations that have taken place on another pressure control apparatus that is substantially similar to the pressure control apparatus 100 and then the pump drive settings (DS) are transferred to, or down loaded to, the intelligent pressure control 119I. As will be apparent, the initial settings DS1-DS16 for a particular pressure control apparatus 100 can provide a starting point for operation, but the pump drive settings DS1-DS16 can be optimized during the testing mode as will be described below.

In some embodiments, during the calibration method 300C, the initial pump drive setting can start at a relatively low start voltage below the threshold limits and then ramp up until the measured chamber pressure Pm, as measured by pressure sensor 114, is within the predetermined threshold limits of the target pressure Pt. The obtained first drive voltage when the lower threshold pressure (LTP), i.e., the lower threshold limit, is first met can be saved temporarily. Subsequently, a relatively high pump drive setting can provide a second starting voltage above the threshold limits and then ramp down until the measured chamber pressure Pm, as measured by pressure sensor 114, is within the predetermined threshold limits of the target pressure Pt. This second drive voltage value when the upper threshold pressure (UTP), i.e., the upper threshold limit, is first met can be averaged with the first drive voltage. This average voltage can be used as the pump drive setting to populate the look-up table 227. Accordingly, using this calibration method 300C can account for hysteresis in obtaining the pump drive setting.

For example, because there can be slight differences from one pressure control apparatus 100 to the next, due to tolerances of components, assembly, and variations in operation, any pre-populated initial settings DS1-DS16 may not be optimal. Furthermore, over time pump drive settings may drift due to drift in electrical systems, pump wear, and the like, and may no longer be optimal. Thus, in accordance with another method aspect of the disclosure, the pump drive settings for each operational state combination can be updated in the testing mode to an optimal pump setting by the use of the testing method 300T described with reference to FIG. 3B.

Referring now to FIG. 3B, a testing method 300T is described. According to the testing method 300T, after a previous test has taken place, the method 300T will, in 340, select, via the controller 109, a new operational state combination for the flow control valves 110A-110D. The new operational state combination can be based on the operations that are taking place on the diagnostic testing apparatus at the time. The testing method 300T, in 342, then accomplished measuring of pressure (Pm) in the manifold chamber 106 before making the change to the new operational state combination. The testing method 300T then, preferably so that they take place in unison, outputs, in 344, a pump drive setting to the pump 112, and changes the existing operational state combination of the flow control valves 110A-110D to the new operational state combination in 346, such as by sending drive signals to the flow control valves 110A-110D. Further, the testing method 300T determines, in 348, if the previous measured pressure Pm is within the threshold pressure limits (i.e., between Upper Threshold Pressure (UTP) and the lower Threshold Pressure (LTP)), that have been pre-established and pre-populated in the look-up table 227, for example. If the answer is Yes, then there is no change to the drive setting (DS) stored the look-up table 227 and a new operational state combination can be selected in 340 for the next combination of wash operations taking place on the pipettes (101A-101D). If the answer is No, then the pump drive setting (DS) stored the look-up table 227 is adjusted, in 350, for the next time that operational state combination is selected.

The amount of the adjustment in the pump drive setting can be a fixed amount, an amount based on a proportion or difference between the measured pressure Pm and the target pressure Pt, or some other suitable drive setting adjustment. For example, the optimal drive setting (ODS) can be increased per equation 1 above and then stored in the look-up table 227.

Figure 4:
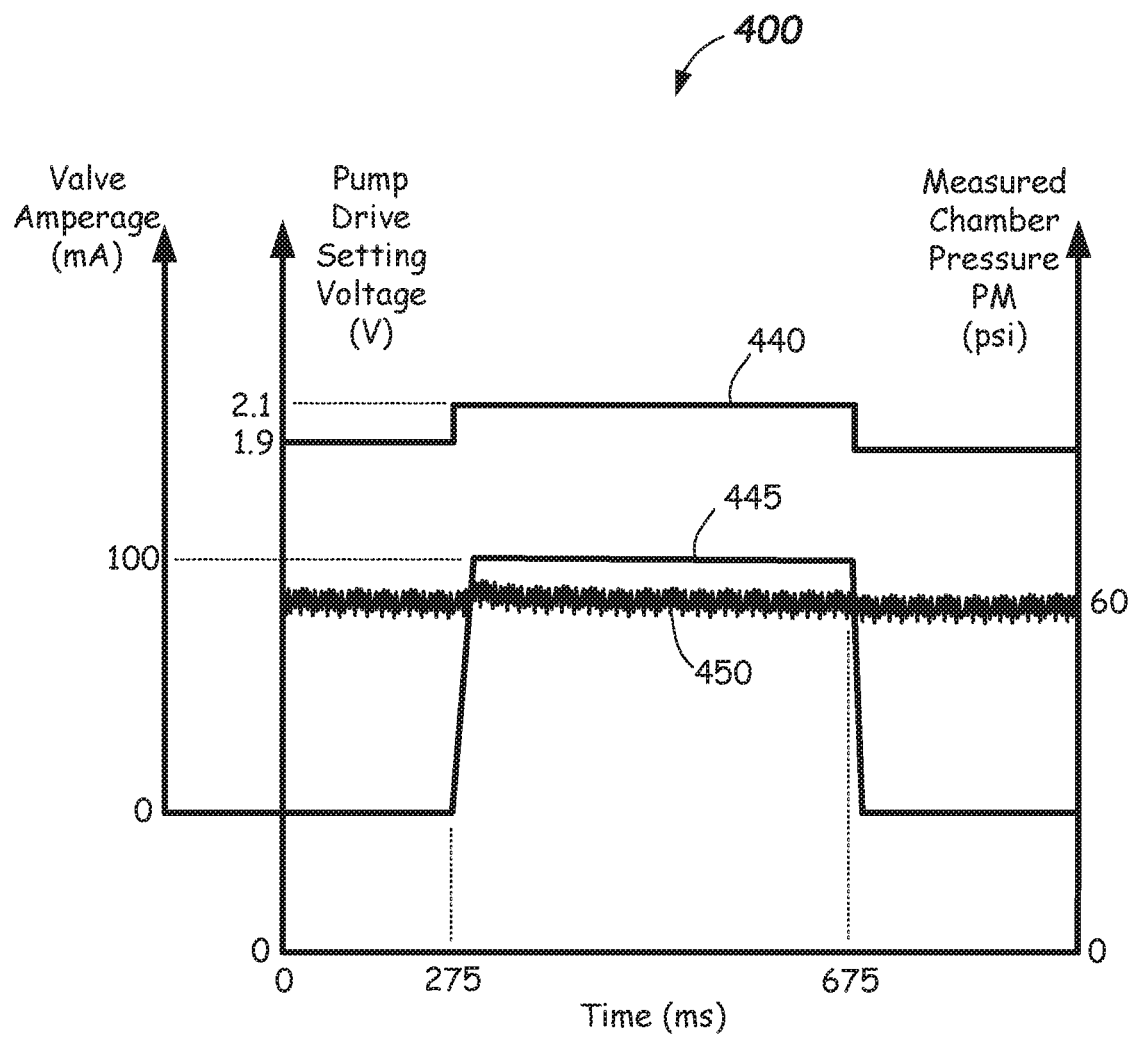
FIG. 4 is a performance plot illustrating pressure control according to embodiments.

FIG. 4 illustrates an example plot 400 of the drive voltage signal 440 based on the pump drive setting (DS) from the look-up table 227 for the combination of ON and OFF states of the flow control valves 110A-110D, a valve drive signal 445 to a flow control valve that is changing state (e.g., from OFF to ON), and resultant pressure plot 450 over time when driving to a new pump drive setting (DS) for the new state of the flow control valves 110A-110D. Resultant pressure plot 450 illustrates that the measured pressure Pm varies by only a small amount in the depicted embodiment (e.g., less than about 5%, or even less than about 2%, or even less than about 1%) as the state combination is changed. Accordingly, the substantially constant target pressure Pt is achieved within the manifold chamber 106.

Having shown and described various embodiments of the disclosure, those skilled in the art will realize many other variations are possible that will still be within the scope of the claimed invention. Therefore, it is the intention to limit the invention only as indicated by the claims and equivalents thereof.

What is claimed is:

1. A pressure control apparatus, comprising:
   a plurality of pipettes configured to dispense a liquid from an outlet of each of the plurality of pipettes;
   a manifold including a manifold chamber configured to supply the liquid to the outlets of the plurality of pipettes through flow paths passing between the manifold chamber and the outlets;
   a flow control valve in each of the flow paths and configured to modulate a flow of the liquid in each of the flow paths;
   a pump interconnected to a liquid source and configured to supply the liquid to the manifold chamber and maintain a target pressure in the manifold chamber;
   a pressure sensor coupled to the manifold chamber and configured to provide a measured pressure correlated to a pressure within the manifold chamber; and
   a flow controller configured to command an individual operational state combination from a plurality of operational state combinations, the flow controller further configured to:
      in a calibration mode, decrease a pump drive setting if the measured pressure is too high, increase the pump drive setting if the measured pressure is too low, and store the pump drive setting for the individual combined operational state if the pressure measurement is within predetermined pressure threshold limits of the target pressure, or
      in a testing mode, determine if the measured pressure in the manifold chamber is within the predetermined pressure threshold limits of the target pressure for a previously-commanded state combination commanded prior to the individual operational state combination, and adjust the pump drive setting if not within the predetermined pressure threshold limits for a next time the previously-commanded state combination is commanded.

2. The pressure control apparatus of claim 1, further comprising a look-up table including the pump drive setting for each of the plurality of operational state combinations of the flow control valves.

3. The pressure control apparatus of claim 1, further comprising a return flow channel coupled between the manifold chamber and the liquid source, the return flow channel including a fixed flow restrictor therein.

4. The pressure control apparatus of claim 1, wherein the flow control valve in each of the flow paths comprise a solenoid-actuated valve.

5. The pressure control apparatus of claim 1, wherein the flow control valve in each of the flow paths comprise valves having an ON state and an OFF state.

6. The pressure control apparatus of claim 1, wherein a number of flow control valves in the pressure control apparatus is between 2 and 22.

7. The pressure control apparatus of claim 1, wherein the predetermined pressure threshold limits are plus or minus a percentage of the target pressure.

8. The pressure control apparatus of claim 1, wherein the predetermined pressure threshold limits are plus or minus 5% of the target pressure.

9. The pressure control apparatus of claim 1, wherein the predetermined pressure threshold limits are plus or minus 2% of the target pressure.

10. The pressure control apparatus of claim 1, wherein the target pressure in the manifold chamber is between 50 psi and 70 psi.

11. A pressure control method for maintaining manifold pressure in a manifold chamber of a flow control apparatus in a diagnostic testing apparatus, comprising:
    characterizing an operational state combination of a plurality of flow control valves in flow paths connected to the manifold chamber;
    providing a drive setting to a pump supplying liquid to the manifold chamber;
    measuring a pressure in the manifold chamber to provide a measure pressure;
    determining if the measured pressure in the manifold chamber is within predetermined pressure threshold limits of a target pressure; and
    either:
       increasing or decreasing the drive setting if not within the predetermined pressure threshold limits, or
       storing an optimal drive setting for the operational state combination of the plurality of flow control valves if within the predetermined pressure threshold limits.

12. The pressure control method of claim 11, comprising determining the measured pressure in the manifold chamber with a sensor coupled to the manifold chamber.

13. The pressure control method of claim 11, wherein the predetermined pressure threshold limits are plus or minus a percentage of the target pressure.

14. The pressure control method of claim 13, wherein the predetermined pressure threshold limits are plus or minus 5% of the target pressure.

15. The pressure control method of claim 13, wherein the predetermined pressure threshold limits are plus or minus 2% of the target pressure.

16. The pressure control method of claim 11, wherein the increasing of the drive setting if not within the predetermined pressure threshold limits comprises adjusting the drive setting upward if the measured pressure is too low to the optimal drive setting.

17. The pressure control method of claim 16, comprising storing the optimal drive setting for the operational state combination of the plurality of flow control valves.

18. The pressure control method of claim 11, wherein the decreasing of the drive setting if not within the predetermined pressure threshold limits comprises adjusting the drive setting downward if the measured pressure is too high to the optimal drive setting.

19. The pressure control method of claim 18, comprising storing the optimal drive setting for the operational state combination of the plurality of flow control valves.

20. The pressure control method of claim 11, comprising providing a return flow channel to a liquid source that provides a constant flow restriction.

21. A pressure control method for maintaining pressure in a manifold chamber of a flow control apparatus in a diagnostic testing apparatus, comprising:
- selecting a new operational state combination of a plurality of flow control valves in flow paths connected to the manifold chamber;
- measuring the manifold pressure in the manifold chamber of an existing operational state combination before making a change to the new operational state combination;
- outputting a pump drive setting to a pump supplying liquid to the manifold chamber;
- changing from the existing operational state combination to the new operational state combination;
- determining if the measured pressure in the manifold chamber is within predetermined pressure threshold limits of a target pressure; and
- either:
  - selecting another new operational state combination, or
  - adjusting the pump drive setting for the existing operational state combination if not within the predetermined pressure threshold limits.

\* \* \* \* \*